E. MECHAU.
MOTION PICTURE PROJECTION APPARATUS.
APPLICATION FILED SEPT. 2, 1921.
1,401,345.
Patented Dec. 27, 1921
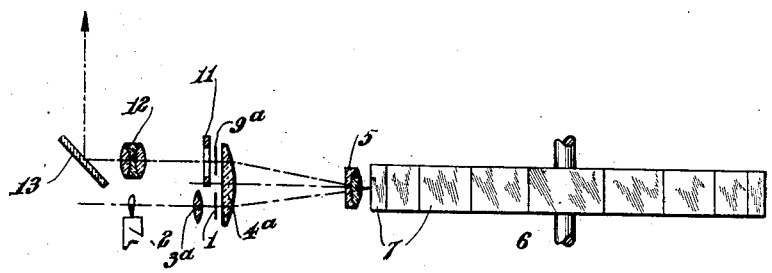
Emil Mechau Inventor
By his Attorney Richard Eyre

UNITED STATES PATENT OFFICE.

EMIL MECHAU, OF WETZLAR, GERMANY.

MOTION-PICTURE-PROJECTION APPARATUS.

1,401,345.  Specification of Letters Patent.  Patented Dec. 27, 1921.

Application filed September 2, 1921. Serial No. 498,008.

*To all whom it may concern:*

Be it known that I, EMIL MECHAU, a citizen of Germany, residing at Wetzlar, Germany, have invented certain new and useful Improvements in Motion-Picture-Projection Apparatus, (Case 1,) (and for which I have filed application in Germany October 13, 1919: England October 13, 1920; Belgium October 11, 1920; France October 8, 1920; Italy October 12, 1920; Holland October 16, 1920; Austria October 13, 1920, and Switzerland September 22, 1920,) of which the following is a specification.

My invention relates to an improvement in that type of apparatus for projecting motion pictures in which the picture film is moved continuously, and means are provided for compensating for the picture movement. In this class of apparatus there is difficulty in obtaining such sharp delimitation of the picture on the screen, especially at the top and bottom that no parts of adjoining pictures are visible.

It is the object of my present invention to provide simple and reliable means in such apparatus whereby this sharp delimitation or framing of the picture is effected, and which means may be employed in combination with various known compensating devices so that my invention may be added to various existing apparatus to effect the desired framing.

So far as I am aware, the various means that have been heretofore been suggested, to effect the framing of the picture on the screen in this type of apparatus, have either given inadequate results or have involved the employment of expensive and complicated apparatus. Some of these framing means have been dependent for their operation upon the use of a particular form of compensating device. The framing means provided in accordance with my present invention is not restricted to any particular form of compensating device and enables one to select the particular compensating device that seems preferable.

My improved framing or delimitation means involves generally stated the employment of a novel arrangement of optical devices which will produce a stationary real image of the picture that is to be projected on the screen and the provision of a suitable framing device closely adjacent to the real image. This real image is produced at a suitable distance from the film and between the compensating device and the projecting screen. By producing such stationary real image of the picture and placing a screen close to this image, whether in front or behind it, the picture appearing on the screen is sharply framed.

More specifically my invention resides in the employment of a compensating device of the type aforeindicated together with a single condensing lens system which is adapted to produce a real image of the picture to be projected upon the screen and which is located both in the light path between the picture and the compensating device, and in the light path between the compensating device and the screen.

I have shown in the drawing one specific form of apparatus embodying my invention, but I desire it to be understood that my invention, as set forth in the appended claims, is not dependent upon the use of any particular compensating device or of the precise means shown for producing the stationary real image at the desired point.

The drawing diagrammatically illustrates one way of embodying my invention in a projecting machine, wherein the device for compensating for the picture movement is a ring of mirrors rotating synchronously with the movement of the film.

Referring more particularly to the drawing, the film 1 travels continuously during the projection of the picture. 2 indicates the source of light which reaches the film through the lens 3ª in the customary manner. 4ª is a collecting lens which is placed closely adjacent to the film, and together with an optical element 5 forms a condensing lens system whose focal plane is at the film or in the film path 4. 6 is the compensating device which rotates in synchronism with the movement of the picture film, so that one of its elements 7 occupies the position of an adjacent element 7 in the time taken for one picture on the film to occupy the place of the adjacent picture. In the particular embodiment herein illustrated these elements 7 consist of a series of mirrors. The mode of operation and results effected by this compensating device whereby the angular and parallel movement of the rays of light, as the mirrors 7 move through the focal axes of the condensing lens system and maintains the picture on the screen, is well understood in the art and forms no part of my present invention. It is enough to point out that the movement and angular positions of adjacent mirrors at each instant are so coördinated with the position of the picture film that parts of adjacent pictures on the film appear as a single picture on the screen. The lens system 4ª and 5 is disposed in both the ray paths leading to and from the compensating device and is adapted to produce a stationary real image 9ª adjacent to the collecting lens 4ª. 11 is an opaque frame having an aperture placed as closely as possible to the position at which the stationary image is formed. 12 is the objective by which the stationary real image, delimitated produced and by the optical system and frame 11 is projected on the screen by means of the stationary mirror 13.

In the embodiment illustrated the film 1 behind the lens 3ª is moving in a plane at right angles to the paper, and the collecting lens 4ª is placed so that the film is wholly at one side of its axis. The compensating device is so placed with relation to the condensing lens system 4ª and 5 that the rays are reflected back from the successive mirrors 7 through the lens system to produce the stationary real image 9ª immediately beside or in the plane of the moving film.

The operation of the system is apparent from the above description. The film 1 and the compensating device 6 are driven at synchronous speed, and with the proper adjustment of the lens system 4ª and 5 with reference thereto, stationary real images of the moving pictures of the film are consecutively produced at 9ª and projected through the medium of objective 12 and reflector 13 upon a screen (not illustrated). The single optical system 4ª and 5 is employed in both the ray paths leading to and from the compensating device and this system together with the coöperating compensating and delimitating and projecting devices effects a sharp delimitation and projection of the pictures on the screen.

Having thus described my invention what I claim as new and desire to secure by Letters Patent is:

1. In a motion picture projection apparatus of the class wherein the picture film is continuously moved and a compensating optical device is employed whereby a picture is maintained on the screen, a single fixed condensing lens system which is adapted to produce a stationary real image of the picture to be projected upon the screen and is located both in the light path between the picture and the compensating device, and the light path between the compensating device and the screen means coöperating therewith for projecting the real image so formed upon the screen.

2. In a motion picture projection apparatus of the class wherein the picture film is continuously moved and a compensating optical device is employed whereby a picture is maintained on the screen, the combination of a single fixed condensing lens system which controls the rays passing from the film to the compensating device and also receives the rays from the compensating device and forms a stationary real image of the picture to be projected upon the screen, with means for delimitating and projecting the real image so formed upon the screen including a projecting lens.

3. In a motion picture projection apparatus of the class wherein the picture film is continuously moved and a compensating optical device is employed whereby a picture is maintained on the screen, a single fixed condensing lens system which controls the rays passing from the film to the compensating device and also receives the rays from the compensating device and forms a stationary real image of the picture to be projected upon the screen, and a framing device adjacent to said image.

In testimony whereof I have signed my name to this specification.

EMIL MECHAU.

Witnesses:
HANS. VEDTE,
WILH. MINNICH.